(12) United States Patent
Wisniewski et al.

(10) Patent No.: US 7,984,341 B2
(45) Date of Patent: Jul. 19, 2011

(54) METHOD, SYSTEM AND COMPUTER PROGRAM PRODUCT INVOLVING ERROR THRESHOLDS

(75) Inventors: Rebecca S. Wisniewski, Poughkeepsie, NY (US); Mark S. Farrell, Pleasant Valley, NY (US); Patrick J. Meaney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/036,697

(22) Filed: Feb. 25, 2008

(65) Prior Publication Data

US 2009/0217110 A1    Aug. 27, 2009

(51) Int. Cl.
*G06F 11/00* (2006.01)

(52) U.S. Cl. ............ 714/704; 714/25; 714/48; 714/705; 714/712; 714/799; 455/522; 710/267; 370/242; 370/349; 370/244; 370/225

(58) Field of Classification Search .................. None
See application file for complete search history.

(56) References Cited

U.S. PATENT DOCUMENTS

| | | | |
|---|---|---|---|
| 5,661,615 A | 8/1997 | Waugh et al. | |
| 6,158,021 A * | 12/2000 | Ziegler et al. | 714/25 |
| 6,856,600 B1 * | 2/2005 | Russell et al. | 370/244 |
| 7,124,329 B2 | 10/2006 | Ackaret et al. | |
| 7,225,369 B2 * | 5/2007 | Schumacher et al. | 714/55 |
| 7,612,464 B2 * | 11/2009 | Yano | 307/10.1 |
| 2004/0153886 A1 * | 8/2004 | Schumacher et al. | 714/55 |
| 2005/0128998 A1 * | 6/2005 | Jelitto et al. | 370/349 |
| 2005/0183130 A1 | 8/2005 | Sadja et al. | |
| 2006/0224808 A1 * | 10/2006 | Depew et al. | 710/267 |
| 2007/0149234 A1 * | 6/2007 | Bomash | 455/522 |

FOREIGN PATENT DOCUMENTS

| | | |
|---|---|---|
| JP | 3250227 | 11/1991 |
| JP | 2002278848 | 9/2002 |

OTHER PUBLICATIONS

D. Nemir et al., "Arc Fault Management Using Solid State Switching," 2004-01-3197, Copyright 2004 SAE International, SAE Transactions Journal of Aerospace, pp. 1932-1942, 2004.

* cited by examiner

*Primary Examiner* — John P Trimmings
(74) *Attorney, Agent, or Firm* — Cantor Colburn LLP; John Campbell

(57) ABSTRACT

A system for processing errors in a processor comprising, an error counter, a pass counter, and a processing portion operative to determine whether a first error is active, increment an error counter responsive to determining that the first error is active, increment the pass counter responsive to determining that all errors have been checked, and clear the error counter responsive to determining that the pass counter is greater than or equal to a pass count threshold value.

11 Claims, 4 Drawing Sheets

| Time (s) | Error Determination | Error Count | Action |
|---|---|---|---|
| 0 | None | 0 | Reset counts at 60 seconds |
| 5 | A | 1 | |
| 10 | B | 1 | |
| 15 | C | 1 | |
| 20 | E | 1 | |
| 25 | A | 2 | |
| 30 | B | 2 | |
| 35 | C | 2 | |
| 40 | E | 2 | |
| 45 | A | 3 | |
| 50 | B | 3 | |
| 55 | C | 3 | |
| 60 | E | 1 | Reset counts at 60 seconds |
| 65 | A | 1 | |
| 70 | B | 1 | |

FIG. 2     Prior Art

| Time (s) | Error Pass | Error Determination | Error Count | Action |
|---|---|---|---|---|
| 0 | 0 | None | 0 | Reset counts before 12th pass |
| 5 | 1 | A | 1 | |
| 10 | 1 | B | 1 | |
| 15 | 1 | C | 1 | |
| 20 | 1 | E | 1 | |
| 25 | 2 | A | 2 | |
| 30 | 2 | B | 2 | |
| 35 | 2 | C | 2 | |
| 40 | 2 | E | 2 | |
| 45 | 3 | A | 3 | |
| 50 | 3 | B | 3 | |
| 55 | 3 | C | 3 | |
| 60 | 3 | E | 3 | |
| 65 | 4 | A | 4 | Call Home, error A |
| 70 | 4 | B | 4 | Call Home, error B |
| 75 | 4 | C | 4 | Call Home, error C |
| 80 | 4 | E | 4 | Call Home, error E |
| 85 | 5 | A | 5 | |
| 90 | 5 | B | 5 | |
| 95 | 5 | C | 5 | |
| 100 | 5 | E | 5 | |
| ⋮ | ⋮ | ⋮ | ⋮ | ⋮ |
| X | 12 | None | 0 | Reset counts before 12th pass |

FIG. 4

METHOD, SYSTEM AND COMPUTER PROGRAM PRODUCT INVOLVING ERROR THRESHOLDS

BACKGROUND OF THE INVENTION

This invention relates generally to processing error information, and more particularly processing error thresholds in a computer system.

Microprocessor systems often detect errors to self-diagnose the systems: Low error rates may be ignored because they may not significantly impact the performance of the processor, however higher error rates may indicate more severe errors. Error thresholds are used to detect more severe errors by determining whether an error occurs at a rate above a threshold. Errors are often processed in a round-robin scheme that reduces code processing overhead. For example, if one error is detected, it is monitored or logged and may be used to update a threshold count. A second error is processed on a next iteration or pass after a first error. If a certain number of errors are detected within a given amount of time (e.g. 10 errors in one minute), a threshold may be reached. If the threshold is not reached in the given amount of time, the threshold count is reset.

If a time limit for an error threshold passes before all of the errors have been processed, a high error rate may not be detected, and severe errors may not be found. It is desirable for a method and system that detects high error rates more accurately without increasing code processing overhead.

BRIEF SUMMARY OF THE INVENTION

An exemplary embodiment includes a system for processing errors in a processor comprising, an error counter, a pass counter, and a processing portion operative to determine whether a first error is active, increment an error counter responsive to determining that the first error is active, increment the pass counter responsive to determining that all errors have been checked, and clear the error counter responsive to determining that the pass counter is greater than or equal to a pass count threshold value.

An exemplary method for analyzing processor error data includes determining whether a first error is active, incrementing an error counter responsive to determining that the first error is active, incrementing a pass counter responsive to determining that all errors have been checked, determining whether the pass counter is greater than or equal a pass count threshold value, clearing the error counter responsive to determining that the pass counter is greater than or equal to the pass count threshold value.

An exemplary embodiment of a computer program product for providing real-time recommendations, the computer program product comprising, a computer-readable storage medium for storing instructions for executing a real-time recommendation service, the real-time recommendation service comprising a method of, determining whether a first error is active, incrementing an error counter responsive to determining that the first error is active, incrementing a pass counter responsive to determining that all errors have been checked, determining whether the pass counter is greater than or equal a pass count threshold value, clearing the error counter responsive to determining that the pass counter is greater than or equal to the pass count threshold value.

BRIEF DESCRIPTION OF THE DRAWINGS

Referring now to the drawings wherein like elements are numbered alike in the several FIGURES:

FIG. 2 illustrates an example of table of a prior art method for error detection.

FIG. 4 illustrates an exemplary embodiment of a table showing an example of the operation of the method for error detection of FIG. 3.

DETAILED DESCRIPTION OF EXEMPLARY EMBODIMENTS

An exemplary embodiment of the present invention provides improved error detection and analysis in a processor system. Some errors in a processor system, such as, for example, soft and transient errors may normally occur in a system. It is not necessary to address soft and transient errors that occur. However, errors that occur repeatedly over a short period of time may be problematic, and are often designated for repair or maintenance action.

Figure 1:
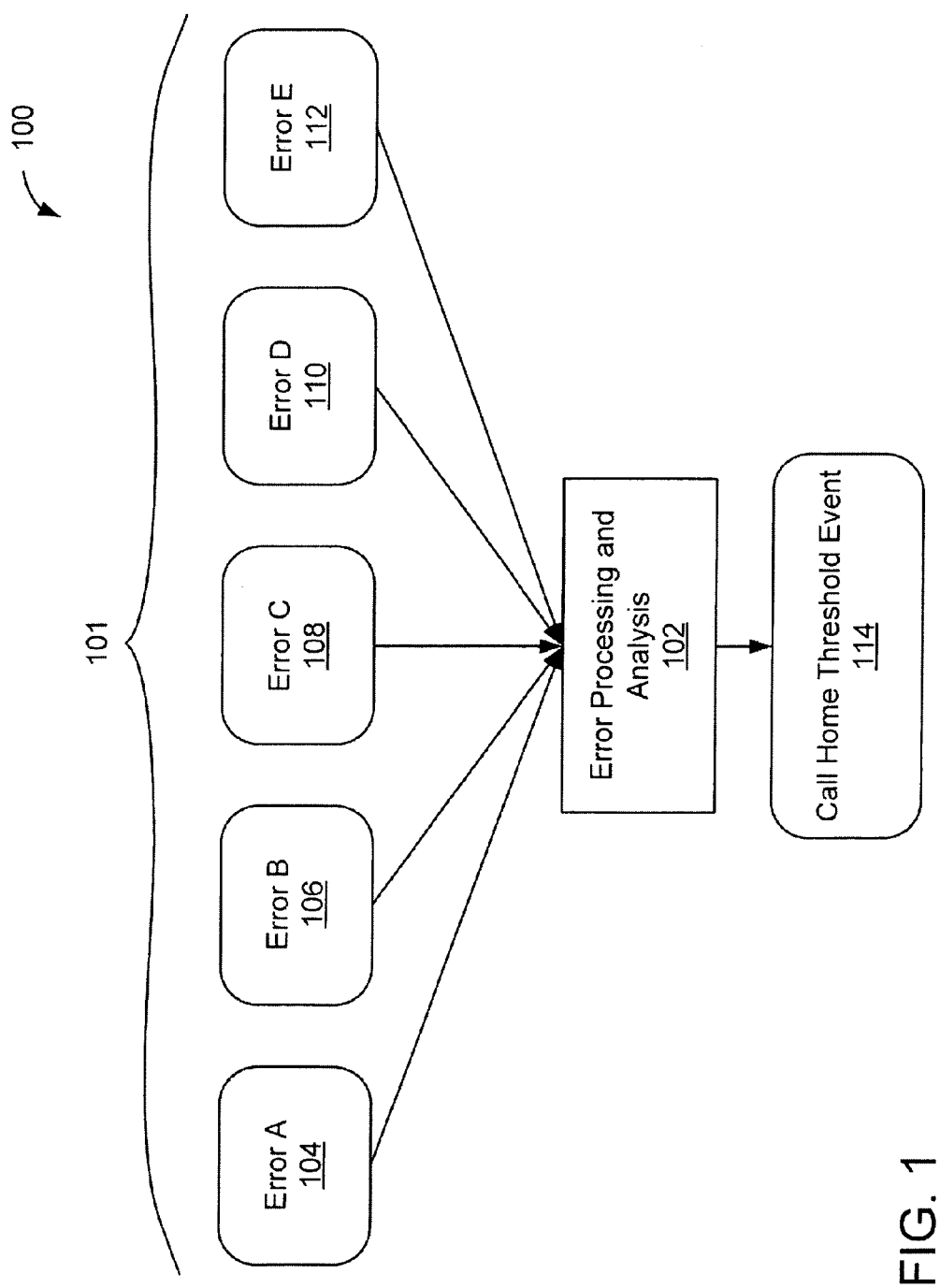
FIG. 1 illustrates an exemplary embodiment of a processor system.

FIG. 1 illustrates a block diagram of an exemplary embodiment of a processor system 100. The system 100 includes an error detection and analysis portion in block 102. The error detection and analysis portion 102 detects errors 101 that include error A 104, error B 106, error C 108, error D 110, and error E 112. The error detection and analysis portion 102 detects the errors in a round-robin scheme. For example, first the error detection and analysis portion 102 determines (checks) if the error A 104 is active. If the error A 104 is active, the error detection and analysis portion 102 processes the error A 104. The error detection and analysis portion 102 then checks the error B 106. The error detection and analysis portion 102 repeats the round-robin process until all the errors 101 A-E are checked. If the number of active or detected errors exceeds a threshold, the error detection and analysis portion 102 executes a call home threshold event 114 notification that may be used, for example, to initiate service or repair action.

Previous systems have used a threshold based on a time domain to determine whether the call home threshold event 114 should be executed. For example, if a bus (not shown) experiences more than 4 errors in a minute, the bus may need repair action. If a minute passes and the bus has not experienced more than 4 errors, the count of errors is reset, and another minute timer begins while the bus is checked for errors.

However, since the round robin process takes time to check and process each error, if a number of different errors occur in a short succession, the time period may pass and be reset before the number of errors that would execute the call home threshold event 114 are processed.

FIG. 2 shows a table demonstrating a prior art example of the round robin process with a time based error rate threshold. In the illustrated example, the error rate threshold is four errors per 60 seconds. Thus, if an error occurs four times in 60 seconds, the call home threshold event 114 notification is initiated. The table of FIG. 2 includes a time column, an error determination column, an error count column, and an action column. The time column shows a time span in five-second increments, where an error determination (check) is made every five seconds. The error determination column shows if an error (error A-E of FIG. 1) is active. The count column shows the number count of errors for each error A-E. The action column includes the action taken.

In the example of FIG. 2, errors A, B, C, and E occur regularly. Since the error detection and analysis portion 102 is operating with a round-robin process the errors are determined (checked) sequentially. The error A 104 is processed and determined to be active at the 5-second mark, and the count is incremented to 1 for the error A 104. At the 10-second mark, the next error determined is error B 106 that is active. Thus, the count for error B 106 is updated from 0 to 1 at the 10-second mark. At 15 seconds, error C 108 is determined. At 20 seconds, error D 110 is determined, but is not active. Error E 112 is checked and is active. Thus, the count for error E 112 is incremented from 0 to 1 at time 20 seconds. At 25 seconds, the round robin wraps from error E 112 to error A 104. Error A 104 reaches a count of 2 at 25 seconds. The process continues until time 55, when counts for errors A 104, B 106, and C 108 are all at 3 and error E 112 has a count of 2. Since the next time is 60 seconds, all error counters get reset. In spite of multiple notable errors, none of the counters reached a threshold of 4 before the 60-second count was complete. As a result, no call home threshold event 114 notification was initiated.

Figure 3:
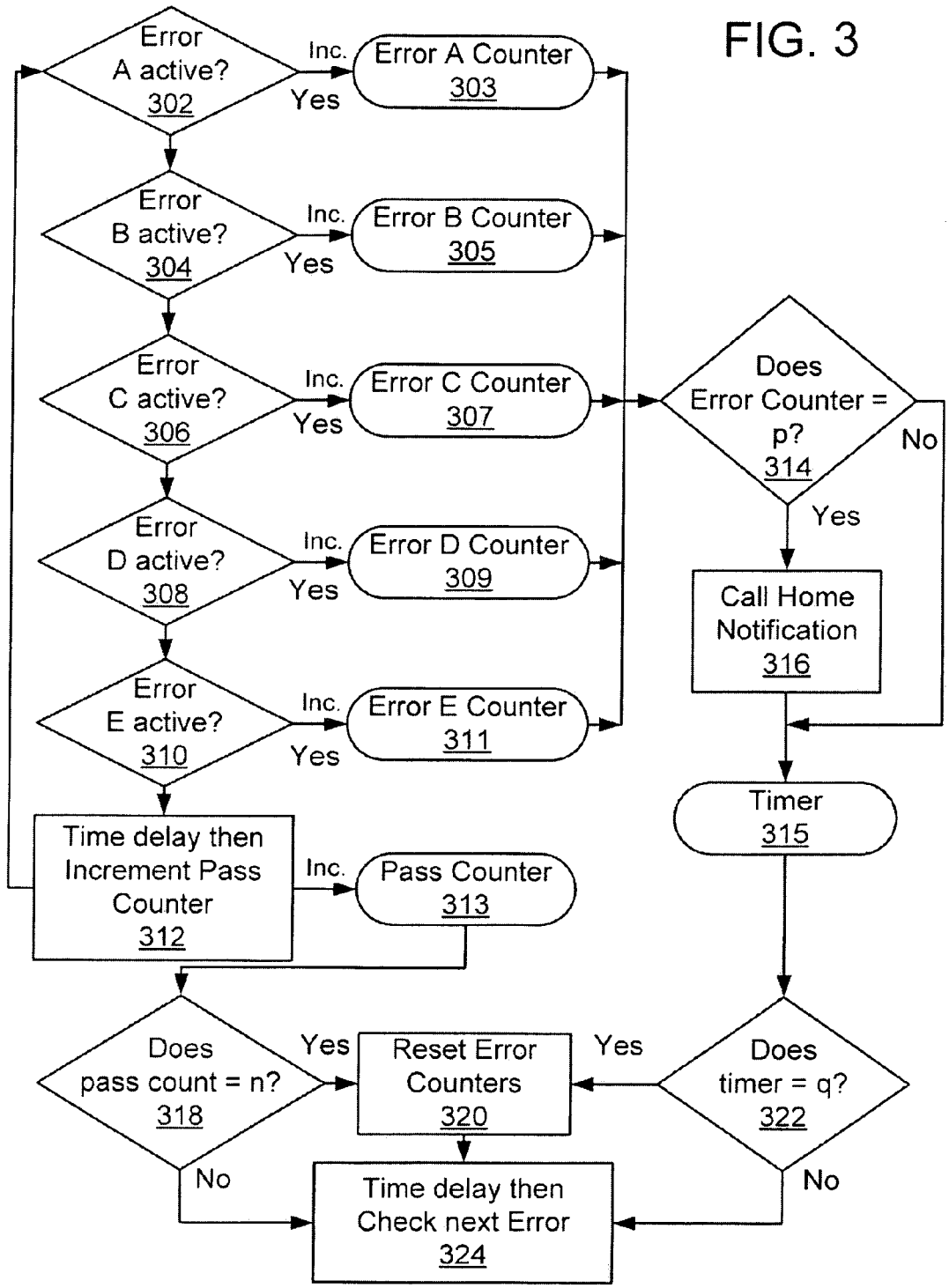
FIG. 3 illustrates a block diagram of an exemplary method for error detection.

FIG. 3 illustrates a block diagram of an exemplary error determination method that may detect multiple errors within a threshold that is not time based. The method of FIG. 3 allows a round robin check of multiple active errors to be processed and a call home threshold event 114 notification to be initiated without resetting the error counters when a time threshold is reached. The method of FIG. 3 may be processed by, for example, the error detection and analysis portion 102 of the processor 100 (of FIG. 1).

Referring to FIG. 3, the figure includes error counters 303, 305, 307, 309, and 311, a pass counter 313, and a timer 315. The method starts in block 302 where the error A 104 is checked to determine whether the error A 104 is active; i.e., whether a new error A 104 exists. Once the error A 104 is checked in block 302, and determined to be inactive, error B 106 is checked in block 304, blocks 306, 308, and 310 are similarly checked to determine whether the errors 101 are active. A time delay may be initiated prior to checking an error if it is determined that a minimum time has not expired since the previous processing of the error. For example, if error B is checked in a first check, followed by the checking of errors C, D, E, and A, and the minimum time has not expired prior to a second check of error B, a time delay may be initiated before the second check of error B.

Once all of the errors 101 (in this exemplary embodiment errors A-E) have been checked, a "pass" has been completed. Once a pass is completed, the pass counter 313 is incremented in block 312. The pass counter 313 is read in block 318. If the pass counter value exceeds a defined threshold value (n), the error counters are reset in block 320. Once the error counters are reset in block 320, the next error is checked in block 324.

If an error is determined to be active in one of the blocks 302, 304, 306, 308 and 310, the respective error counter is incremented. For example, if the error B is determined to be active in block 304, the error B counter 305 is incremented. In block 314, the error counters are read. If any of the error counters have a count that exceeds a defined threshold value (p), a call home notification is sent in block 316. The sending of a call home notification allows, for example, troubleshooting and maintenance of the error that has exceeded the threshold value (p). Once the call home notification is sent in block 316, or if it is determined that the error counter does not equal (p) in block 314, a time delay is initiated in a block 317. Once the time delay has passed, the timer 315 is monitored in block 322. In some embodiments, if the timer 315 exceeds a defined threshold value (q), the error counters may be reset in block 320. Once block 324 is executed, the next error is checked.

For example, if error A is determined to not be active in block 302, error B is checked in block 304. If error B is determined to be active in block 304, and the error B counter 305 has been incremented, block 314 determines whether the error B counter equals (p). If yes, a call home notification is sent in block 316. Once a call home notification is sent, or if it is determined that the error counter does not equal (p), the time delay is initiated in block 317. Once the time delay has passed, the timer is monitored in block 322. If the timer equals (p) the error counters are reset in block 320. Once the error counters are reset in block 320, or if the timer does not equal (p), the next error is checked (error C in block 306). The process is repeated until a pass is complete (i.e. all of the errors A-E have been checked). Once the pass is complete, the pass counter 313 is incremented. Block 318 determines whether the pass counter equals an (n) value. If yes, the error counters are reset in block 320, and the next error is checked in block 324. If no, the next error is checked in block 324. (Since the error E was the last error checked at the completion of the pass, error A will be the next error checked.)

When the error threshold is insignificant to the number of samples in the time interval, using the time interval may preferable because the relationship may be defined more easily. In a clean running system, the pass counter 313 will be close or equivalent to the timer 315. Because of this, appropriate thresholds with respect to time instead of passes may be used to define design thresholds. If necessary, the time thresholds may be converted into pass thresholds. For instance, if error determinations are performed every 5 seconds, the number of passes per minute is approximately 12 when the error count is low. Therefore, if a threshold of 3 errors in a 45 second period is desired, 3 errors in 9 passes (45/5=9) may be used as a pass threshold.

The use of the pass counter 313 to determine whether the error counters should be reset allows a determination of the number of times that each error 101 is checked. Since the determination is not time dependent, a number of errors may be determined to be active and a call home notification may be sent regardless of the amount of time taken to check each of the errors 101. If desired, the combination of the pass counter 313 with the timer 315 allows the error counters to be reset if a time threshold passes, thereby resetting the counters at a time defined by the threshold value (q).

FIG. 4 illustrates a table showing an example of the operation of the method shown in FIG. 3 above. In this regard, the errors A-E are checked, and errors are found active in errors A, B, C and E. Each time an error is found, the error count for the error is incremented. Once each of the errors is checked, the pass count is incremented. This example has a threshold value (p) of four. Thus, when an error counter reaches 4, a call home notification is sent, as shown in the action column. The threshold value (n) associated with the pass count is 12. Thus, the error counters are reset prior to a $12^{th}$ pass.

Once a threshold for a particular error has been reached and a call home made, the error is marked as reaching the threshold. Once marked, the error count is no longer incremented. This prevents multiple calls home for the same set of errors. Once a suitable repair action is taken, the mark is cleared, and new errors are counted.

Technical effects and benefits include increased detection and analysis of errors in processor systems. The increased detection and analysis allows improved troubleshooting and maintenance of a processor system to increase system performance.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for processing errors in a processor comprising:
    a first error counter;
    a second error counter associated with a second type of processing error;
    a pass counter; and
    a processing portion operative to determine whether a first processing error is active, increment the first error counter responsive to determining that the first processing error is active, determine whether a second processing error is active, increment the second error counter responsive to determining that the second processing error is active, increment the pass counter responsive to determining whether the first processing error is checked and the second processing error is checked, and clear the first error counter and the second error counter responsive to determining that the pass counter is greater than or equal to a pass count threshold value.

2. The system of claim 1, wherein the processing portion is further operative to determine whether the first error counter is greater than or equal to an error count threshold value, and send an error notification responsive to determining that the error counter is greater than or equal to the error count threshold value.

3. The system of claim 1, wherein the system further comprises a timer, and wherein the processing portion is further operative to initiate the timer responsive to determining whether a first error is active, and clear the first error counter responsive to determining that the timer has reached a value that is greater than or equal to a timer threshold value.

4. A method for analyzing processor error data in a processor, the method comprising:
    determining whether a first processing error is active;
    incrementing a first error counter responsive to determining that the first processing error is active;
    determining whether a second type of processing error is active;
    incrementing a second error counter responsive to determining that the second type of processing error is active;
    incrementing a pass counter responsive to determining whether the first processing error is checked and the second type of processing error is checked;
    determining whether the pass counter is greater than or equal to a pass count threshold value;
    clearing the first error counter and the second error counter responsive to determining that the pass counter is greater than or equal to the pass count threshold value.

5. The method of claim 4, wherein the method further comprises:
    determining whether the first error counter is greater than or equal to an error count threshold value;
    sending an error notification responsive to determining that the first error counter is greater than or equal to the error count threshold value.

6. The method of claim 4, wherein the method further comprises:
    initiating a timer responsive to determining whether the first error is active;
    clearing the first error counter responsive to determining that the timer has reached a value that is greater than or equal to a timer threshold value.

7. The method of claim 6, wherein the method further comprises:
    determining whether the first error counter is greater than or equal to an error count threshold value;
    sending an error notification responsive to determining that the first error counter is greater than or equal to the error count threshold value.

8. A computer program product for providing real-time recommendations, the computer program product comprising:
    a computer-readable storage medium for storing instructions for performing a method comprising:
        determining whether a first processing error is active;
        incrementing a first error counter responsive to determining that the first processing error is active;
        determining whether a second type of processing error is active;
        incrementing a second error counter responsive to determining that the second type of processing error is active;
        incrementing a pass counter responsive to determining whether the first processing error is checked and the second type of processing error is checked;
        determining whether the pass counter is greater than or equal to a pass count threshold value;
        clearing the first error counter and the second error counter responsive to determining that the pass counter is greater than or equal to the pass count threshold value.

9. The computer program product of claim 8, wherein the real-time recommendation service further comprises:
    determining whether the first error counter is greater than or equal to an error count threshold value;

sending an error notification responsive to determining that the first error counter is greater than or equal to the error count threshold value.

10. The computer program product of claim 8, wherein the real-time recommendation service further comprises:
    initiating a timer responsive to determining whether a first processing error is active;
    clearing the first error counter responsive to determining that the timer has reached a value that is greater than or equal to a timer threshold value.

11. The computer program product of claim 10, wherein the real-time recommendation service further comprises:
    determining whether the first error counter is greater than or equal to an error count threshold value;
    sending an error notification responsive to determining that the first error counter is greater than or equal to the error count threshold value.

* * * * *